Jan. 30, 1962
J. C. REED
3,018,924
PARTICULATE MATERIAL DISPENSER MEANS
Filed Nov. 3, 1958
3 Sheets-Sheet 1
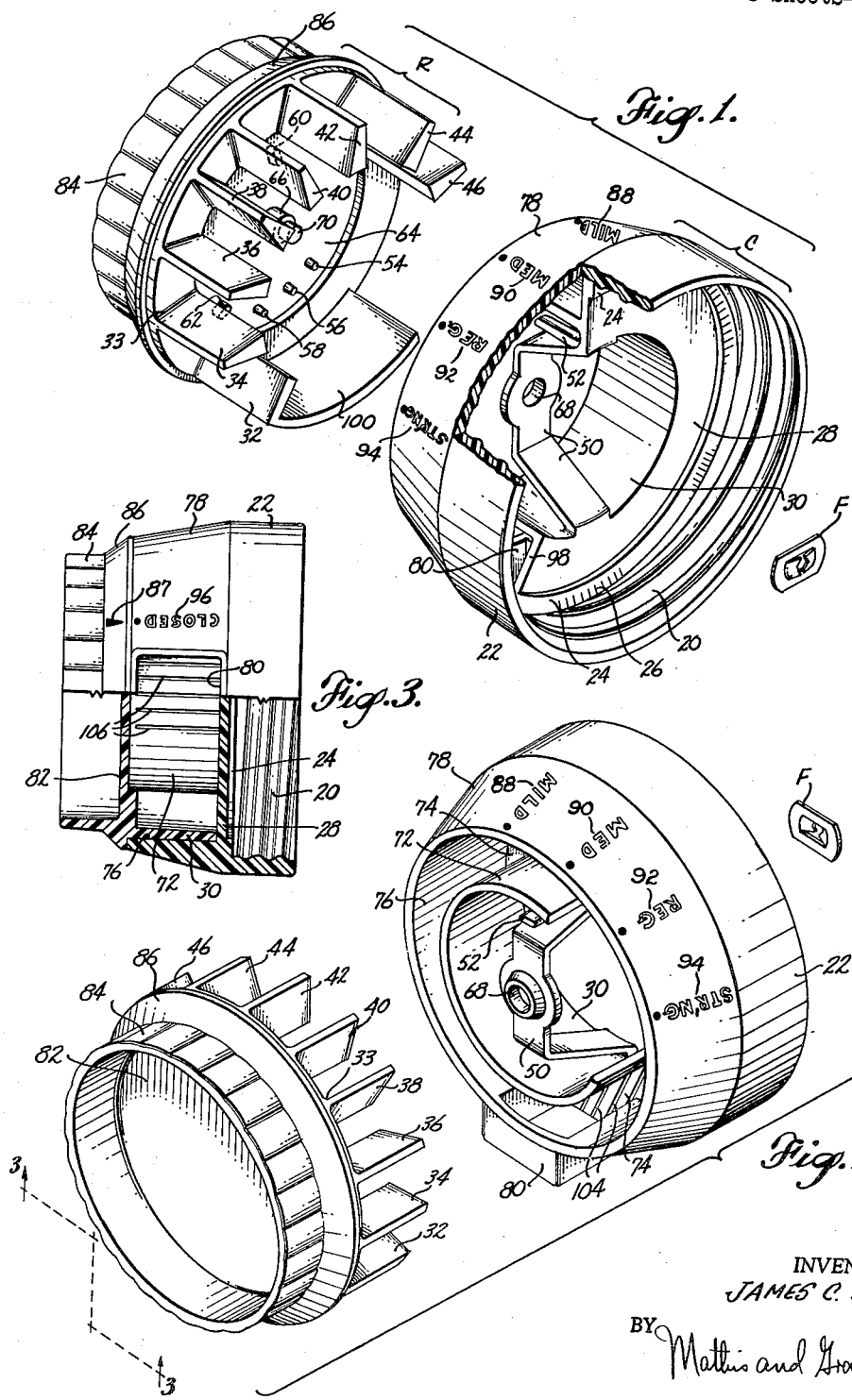
INVENTOR.
JAMES C. REED
BY Mattis and Graybeal
ATTORNEYS Jan. 30, 1962   J. C. REED   3,018,924
PARTICULATE MATERIAL DISPENSER MEANS
Filed Nov. 3, 1958   3 Sheets-Sheet 2

INVENTOR.
JAMES C. REED
BY Mattis and Graybeal
ATTORNEYS

Jan. 30, 1962   J. C. REED   3,018,924
PARTICULATE MATERIAL DISPENSER MEANS
Filed Nov. 3, 1958   3 Sheets-Sheet 3
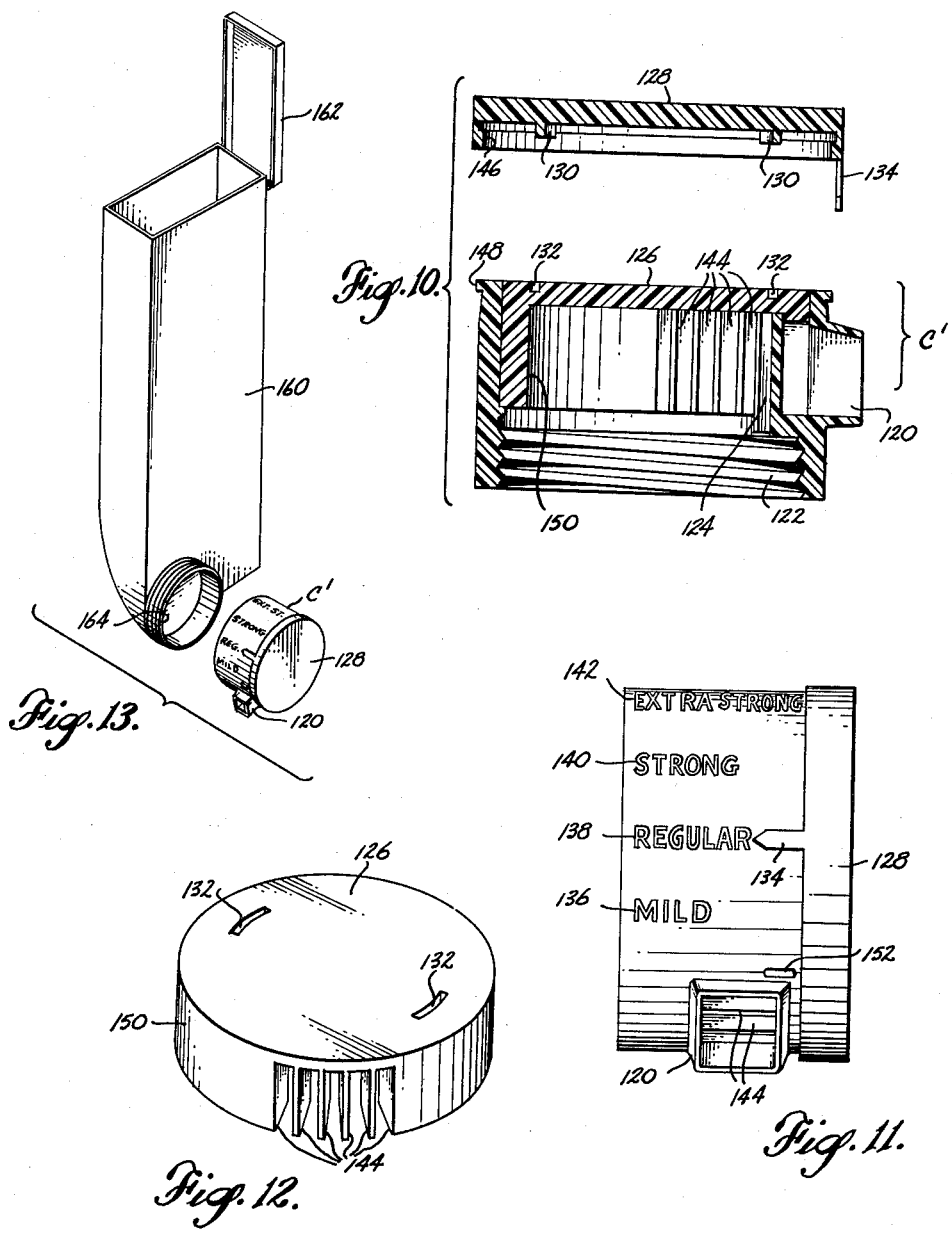
INVENTOR.
JAMES C. REED
BY Mathis and Graybeal
ATTORNEYS

United States Patent Office 3,018,924
Patented Jan. 30, 1962

3,018,924
PARTICULATE MATERIAL DISPENSER MEANS
James C. Reed, Port Orchard, Wash., assignor of one-fourth to William C. Tennesen, one-fourth to Melvin A. Lovik, and one-fourth to Gary E. La Pore
Filed Nov. 3, 1958, Ser. No. 771,253
12 Claims. (Cl. 222—48)

This invention relates to devices for dispensing particulate material, and more particularly relates to metering dispenser devices especially adapted to accurately dispense a desired amount of a particulate material such as coffee, sugar, tea, salt, chemical or other condiment or the like from a commercially standardized container thereof. In a specific typical and therefore non-limitive application of the invention, such has proven to be quite advantageous and satisfactory for the dispensing of measured amounts, i.e. "strengths" of instant coffee from standard sized containers thereof as presently widely marketed.

Heretofore, comparable dispensing devices in general have been designed to operate with the material container having its mouth directed downwardly, and suffer practical disadvantages from the point of view of being cumbersome, bulky, more or less inaccurate in measure and erratic in operation, susceptible to moisture accumulation in and clogging of the particulate material, and comparatively difficult to operate without associated equipment such as a wall mounting for the container, or the like.

Objects and advantages of the present invention include the presentation of dispensing and metering means for particulate material of the character indicated, wherein the dispenser device is particularly adapted to use with the material container held with the axis thereof substantially horizontally disposed (i.e. in the normal and natural position of use), and wherein a rotor member forming a part of the dispenser device can be conveniently manipulated by the other hand of the user while such container is being held horizontally, the device being provided with a downwardly directed spout means or the like for gravitational discharge of the particulate material being dispensed. A related and more specific object and advantage of the present invention is to provide, in a dispenser means, an arrangement of cap and dispensing rotor wherein the axis of rotation of the rotor is substantially coincident with the axis of the mouth of the container.

Yet another object and advantage of the present invention is to provide, in the cap portion of a particulate material dispenser means, a filling-measuring-discharge section or zone of annular or ring-like disposition, such section presenting to the mouth of the container from which the material is being dispensed an open segment and a shielded segment, the rotor portion of the device having annularly disposed spaced partitions interfitting in and rotating in said shielded segment, the discharge spout of the device being disposed radially outwardly from such shielded segment so that there is no direct communication at any time between the discharge spout and the mouth of the container, the said annularly disposed, spaced partitions on the rotor element of the device and the shielded segment of the cap annular section collectively providing metering compartments from which particulate material is discharged as said rotor element is rotated on said cap in a direction moving said partitions from the open segment of said zone into the shielded segment thereof.

It is a more specific and very important object and advantage of the present invention to provide annularly disposed, spaced partitions on said rotor which, when positioned in the open segment of said filling-measuring-discharge section are open on both inner sides to be filled by particulate material at the mouth of the container in any direction having both axial and radial components of movement with respect to the axis of the container mouth, thereby insuring more uniform and more complete filling of the spaces between the partitions and the compartmentation between said partitions and said shielded segment even though the axis of the mouth of the container and the axis of rotation of the rotor element of the dispenser device are disposed substantially horizontally.

A further object and advantage of the present invention is to provide the aforesaid rotor partitions and shielded segment portion of the filling-measuring-discharge section of the dispensing cap, wherein a substantially moisture impervious fit is maintained and wherein any moisture which would penetrate to the particulate material in the container must pass by several seal surfaces before reaching the container contents.

It is another object and advantage of the present invention to provide, in a dispensing device of the character indicated having an annularly disposed filling-measuring-discharge section in the cap thereof, a centrally disposed agitation section or zone, further serving to maintain the particulate material in pourable form, with the additional advantage that certain elements of the agitation section can preferably and advantageously also function as detent means correlatively positioned with respect to the partitions of the rotor element of the device to give the user an indication of the number of metering compartments discharged through the spout, thus also insuring greater accuracy as to metered amount delivered by the device. A related object and advantage of the present invention is to provide either alternatively or conjunctively with the aforesaid detent means, external indicia means functioning to present an indication of the number of compartments discharging through the spout of the dispenser at any given degree of rotation of the rotor element thereof. Yet another related object and advantage is to optionally provide, in the type of dispenser device discussed, ejection means such as grooves and/or spring loaded, yielding wall segments in the walls of the shielded segment portion of the cap facing the discharge spout therein, further facilitating complete discharge of particulate material compartmented between any given pair of adjacent rotor partitions alined with said discharge spout.

Still other objects and advantages of the present invention are found in the construction thereof from plastic in that the cap and rotor elements thereof may be simply and economically formed with integral portions having accurate and uniform dimensions, and in that certain elements thereof such as the detent means and the threaded collar and cap face engaging the article of the container will be unbreakable and will have sufficient resiliency and flexibility to be yieldable and give a proper detent action and give adequate sealing of the container. In practice, it has been found that an advantageous plastic for manufacture of a device of the character presented is a polyethylene. It has been further found that a particularly advantageous elemental arrangement results when the lower or cap element is made from a comparatively soft plastic such as a polyethylene and the upper or rotor element thereof is made from a comparatively harder plastic such as a polystyrene.

Another object and advantage of the present invention is the provision of a dispenser device of the character indicated, wherein the device is expressly designed to render jar type containers with attached dispensers conveniently stackable and packable by use of conventional packing, displaying and handling techniques.

These and other objects and advantages of the invention, as well as the manifest provision of a simple, compact, durable, and strong dispenser which is easy to fabricate and easy to assembly, will be apparent from the following descriptions of certain typical and therefore non-limitive embodiments thereof, as disclosed in connection with the accompanying drawings, wherein like numerals refer to like parts, and wherein:

FIG. 1 is an exploded, perspective view of a metering dispenser device according to the present invention, as viewed from one side and a slightly lower aspect, and with the rotor element thereof in the "closed" rotational position;

FIG. 2 is an exploded, perspective view of the dispenser device illustrated in FIG. 1, as viewed from a side and slightly upper aspect;

FIG. 3 is a side view on a reduced scale and partially in cross section, of the dispensing device illustrated in FIGS. 1 and 2, taken substantially along line 3—3 of FIG. 2 and with the device assembled, the view being with a portion of the device cut away radially through the spout and laterally through the cap and rotor side walls;

FIG. 10 is a partially exploded, cross-sectional side view of a modified form of dispenser device having certain of the characteristics of the present invention;

FIG. 11 is a view in side elevation of the assembled device illustrated in FIG. 10, with the indicia dial thereof set at "Regular" position;

FIG. 12 is a detached, perspective view of a portion of the rotor element of the device illustrated in FIG. 10; and FIG. 13 is an exploded perspective view of the dispenser device illustrated in FIG. 10, showing the manner in which the same is attachable to and usable with a wall mounted type container.

Consideration will now be given to one typical and therefore non-limitive embodiment of the present invention, as presented in FIGS. 1 through 9 of the accompanying drawings. Considered generally, the three separable elements making up the dispenser device are the cap element C, the rotor element R and a metal spring fastener F. Preferably, cap element C and rotor element R are of a plastic material formed by molding, respective particularly suitable plastic materials for this purpose being polyethylene and polystyrene as indicated.

Figure 4:
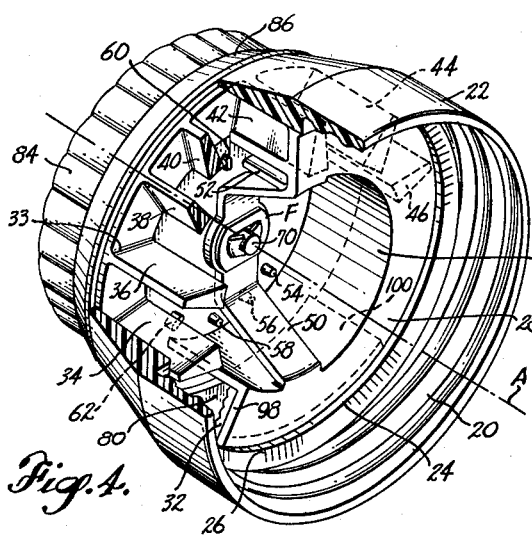
FIG. 4 is a perspective view comparable to the view of FIG. 1, with the elements of the device shown in assembled form and with various portions broken away for clarity of illustration.
Figure 5:
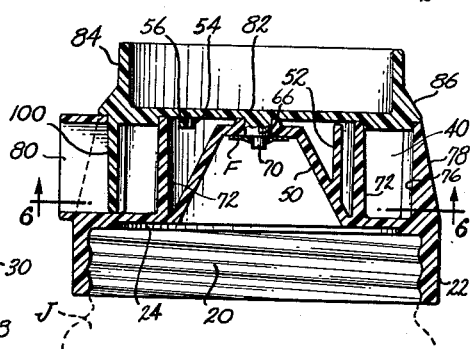
FIG. 5 is a cross-sectional side view of the device illustrated in FIGS. 1-4, taken diametrically through the spout thereof, said FIG. 5 also showing in partial broken line a jar type container with the dispenser device attached thereto.

The embodiment of the dispenser device as shown is particularly adapted for attachment to a conventional jar type container, as shown in partial view by broken line in FIG. 5 at J, by interiorly disposed thread means 20 in coupling collar 22 around the bottom portion of cap C. Of course, container J contains the particulate material to be dispensed, such as instant coffee, for example.

Cap element C further comprises a small interiorly and annularly disposed ledge 24 brought into sealing engagement with the lip edge of the container J when the device is in assembled position thereon, said ledge 24 preferably having small radially disposed scores or grooves 26 or the like to frictionally assist in locking the cap element C from rotation on container J in use.

Considering the assembled spacer device as presenting a face portion delineated by said ledge 24, which is in turn substantially coplanar with the face of the mouth of container J, said dispenser face is, according to the present invention, made up of an annularly disposed filling-measuring-discharging section having a closed segment defined by a flat, radially extending, shield member 28 and a curved, axially extending shield member 30, the remainder of such annular filling-measuring-discharging section being an open segment representing the area in which the spaces between partitions 32–46 on rotor element R are filled, in a manner discussed more fully hereinafter.

Further considering the face of the dispenser device, as presented to the mouth of the container J, the centrally disposed section within said annular filling-measuring-discharging section constitutes what may be termed an agitator section, collectively made up of a diametrically extending preferably arched rotor mounting strap 50, the detent post 52 on cap element C, the nubs 54, 56 and 58, and the stops 60 and 62 on face 64 of rotor R. As will be evident and as discussed in more detail hereinafter, relative rotation between cap C and rotor R in operative manipulation of the dispenser device generates an agitator action, the detent post 52, nubs 54, 56 and 58, and stops 60 and 62 also serving to limit and provide an indication to the user of the number of compartments of particulate material discharged, as also further discussed hereinafter.

Face 64 of rotor element R concentrically presents a cylindrical trunnion 66 received in journal 68 concentrically disposed in strap 50 of cap element C, the said elements being retained in assembled position (FIG. 4) by a suitable fastener element such as spring fastener F being placed in friction engagement with attachment post 70 of the rotor element R.

When thus assembled, rotation of rotor element R on cap element C occurs about an imaginary axis of rotation A which is coaxial with the axis of the mouth of container J. Such disposition of the axis of rotation of rotor element R is an important feature of the present invention since it enables use of the dispenser device in the normal and natural attitude, i.e. with the container J held in one hand in a normal manner and with the rotor element R of the dispenser device manipulated in the convenient grasp of the other hand of the user.

Considering cap element C from an upper aspect, as perhaps best viewed in FIG. 2, the outer wall 72 of cylindrical shield 30, the outer wall 74 of flat shield element 28, and the inner wall 76 of substantially cylindrical configuration of the dial cone 78 all collectively define an annularly disposed channel in which partitions 32–46 interfit and rotate, such channel and said partitions being definable as compartmenting elements in that as the spaces between the partitions are filled in the filling segment of the filling-measuring-discharging section, rotation of the rotor R causes said partitions to pass in such channel under shield elements 28 and 30 and produce a metering action getting a uniformly reproducible amount of the particulate material in each of the metering compartments so formed.

Disposed radially outwardly of said cylindrical shield element 30 is a discharge spout 80 preferably extending only slightly beyond the line of coupling collar 22 for compactness in packaging and handling.

Viewing the rotor element R from an outer aspect, as also perhaps best shown in FIG. 2, such is provided with a preferably inset flat outer face 82 which can advantageously present proprietary or other identifying markings or labeling, which face 82 is in turn surrounded by a knurled knob 84 by which said rotor element R is conveniently rotated. Neck portion 86 of rotor element R bears at one point thereof an indicia marker 87 which functions in conjunction with various indicia markings on dial cone 78 to provide the user with a readily viewable indication of the number of compartments which have discharged through discharge spout 80. Thus, in a typical form of indicia marking as related to the particular use for which the form of the invention illustrated has been adapted, namely, dispensing of instant coffee, indicia markings of "Mild," "Med.," "Reg." and "Strong" are shown at 88, 90, 92 and 94, a "Closed" indicia marking also being presented, as indicated at 96 (FIG. 3).

Figure 6:
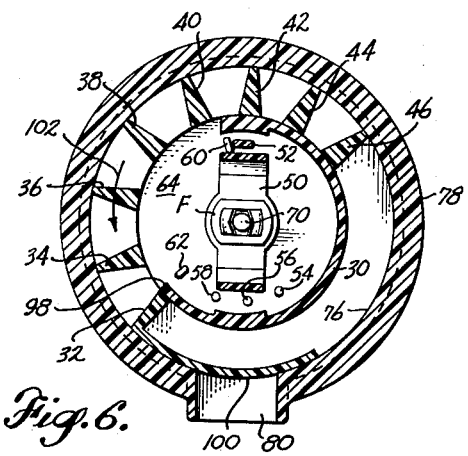
FIG. 6 is a cross-sectional bottom view of the device, taken substantially along line 6—6 of FIG. 5.

As constructed, the embodiment of the invention shown operates to a "Closed" position by rotation to an extreme counter-clockwise position, viewing the rotor from a top aspect, which places the indicia mark 87 opposite the "Closed" marking 96. It is to be observed that in such "Closed" position, the first partition 32 is substantially radially alined with leading edge 98 of shield element 28, all of the spaces between partitions 32, 34, 36, 38 and 40 are in the open segment of the filling-measuring-discharging section, and detent post 52 is against stop 60 (FIG. 6). Also, in such closed position, the spout shield 100 closes off discharge spout 80 (see FIGS. 5 and 6) to implement the moisture sealing action of the dispenser device.

Figure 7:
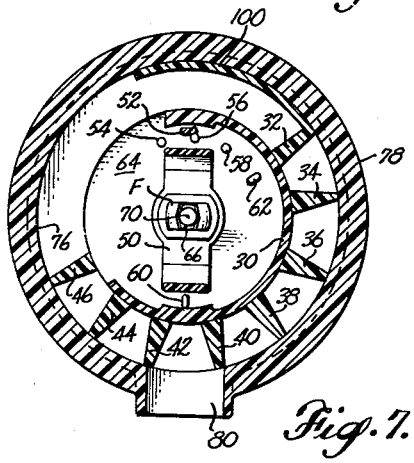
FIG. 7 is a cross-sectional view comparable to the view of FIG. 6, with the rotor element moved to a point where sufficient compartments have discharged through the spout to give a volume of particulate material denoted "Med." by the associated indicia means.
Figure 8:
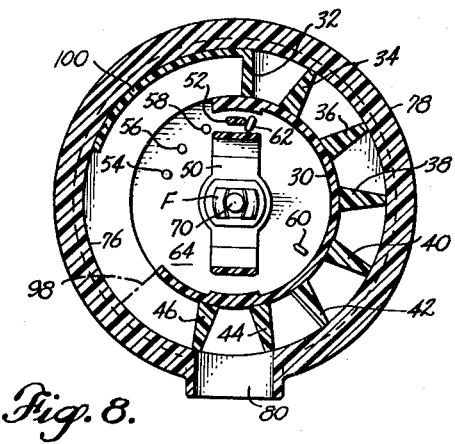
FIG. 8 is a view in cross section, comparable to FIGS. 6 and 7, but with the rotor element rotated further to the "Strong" indicia position.

Beginning at the "Closed" position, and with the device on a container J and held with spout 80 directed generally downwardly (cf. FIG. 6), the filling, metering and discharging action is commenced by relative rotation of rotor element R in the direction indicated at 102 (clockwise of the rotor element as viewed from the top, and counter-clockwise in the bottom cross-sectional views of FIGS. 6–8).

To show the progressive operation of the device, FIG. 7 is a view corresponding to the view of FIG. 6 but with the rotor element rotated to the "Med." position. At this point, relative rotation of the rotor element R has first moved spout shield 100 past discharge spout 80, then has successively discharged the particulate material from the spaces between partitions 32, 34, 36, 38, and 40, the material between partitions 40 and 42 being shown in the act of discharging, and particulate material being shown as still contained in the compartmentation provided in the spaces between partitions 42 and 44 and partitions 44 and 46. Thus, in the construction presented, it will be observed that the instant coffee has been dispensed through discharge spout 80 in an amount to give a cup of instant coffee of medium strength. Further, it is to be noted that detent post 52 has progressed from an initial position in contact with stop element 60 (as in FIG. 6) to a contacting position with nub 56, having past and having been slightly deflected in the meanwhile by nub 54. From this relation and the apparent manner of operation of detent post 52, stops 60 and 62, and nubs 54, 56 and 58, and keeping in mind the somewhat resilient nature of the plastic material from which these elements are formed, it will be readily evident that nub 54 is associated with the "Mild" position of rotor element R, nub 56 is associated with the "Med." position of rotor element R, nub 58 is associated with the "Reg." position of rotor element R, and stop 62 is associated with the "Strong" position of rotor element R. It will also be evident that, as detent post 52 successively contacts each of said nubs 54, 56 and 58 during the progressive rotation of rotor element R, there will be a slight drag or "bump" in the rotating action, caused by the pressure necessary for each successive nub 54–58 to bend detent post 52 out of the way thereof, which momentary drag or "bump" serves to signify to the user that the first, second, or third strength, as the case may be, has been reached. Thus, indication is given to both the visual and touch senses as to the amount of material metered through the dispenser.

Also in connection with the discharging action accorded by the mechanism of the present invention, it has been found quite advantageous to provide outwardly diverging sides to the various partitions 32–46 in order that the compartmentation facing discharge spout 80 is of an expanding area and insures that the discharging of the material through the spout is not interfered with to any extent. Also, to further minimize any tendency for the material to cling in the partitioned compartment, the walls of partitions 32–46 are provided with curved corners where they join the face 64 of rotor element R, one such curved corner being indicated at 33 in FIGS. 1 and 2. It has been found also advantageous to provide what may be termed ejection grooves in the walls 72 and 74 of cap element C facing discharge spout 80, certain of the ejection grooves in surface 74 being indicated at 104 in FIGS. 2 and 9, and certain of the ejection grooves in surface 72 being indicated at 106 in FIG. 3.

FIG. 8 shows the rotor element R rotated to the extreme discharge position, i.e. the "Strong" position, where detent post 52 contacts and is stopped by stop 62.

Obviously, once the progressive discharge rotation has been accomplished, in the progressive manner of movement illustrated in FIGS. 6–8, the rotor element R is then returned by an opposite rotational action to initial or "Closed" position, whereupon the metering action can be repeated as desired.

Figure 9:
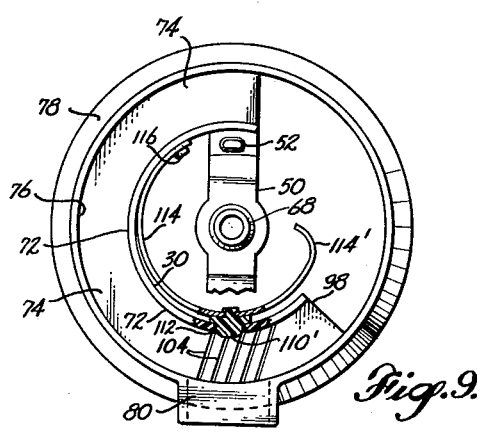
FIG. 9 is a top plan view of the cap element of the device, with the rotor removed; and with a modification adding a spring-loaded yielding compartment wall facing the discharge spout, certain of the elements thereof being shown cut away for clarity of illustration.

The top plan view of the cap element C as presented in FIG. 9, in addition to showing the channelling formed by surfaces 72, 74 and 76 and ejection grooves 104 in surface 74, also serves to show a modification of the device whereby a further ejection means is provided facing discharge spout 80. Specifically, an ejector shoe 110 is channelled in opening 112 in wall 72 facing spout 80, which ejector shoe 110 is spring loaded by spring 114 so as to be yieldable and move radially under the depressant action of the inner edges of partitions 32–46 as said partitions rotate by the raised center 110' thereof. Spring 114 is anchored by friction fit to nub 116 or shield wall 30 and preferably has a free end extension 114' situated in the agitator section of the device and also serving as an agitator. As will be apparent, the periodic depression and release of ejector shoe 110 as the partitions 32–46 pass by same also and of itself gives a dentent action so that detent post 52 and nubs 54–58 can be eliminated, as desired.

It is an important feature of the present invention that throughout the relative range of movement of rotor element R in cap element C, there is no direct exposure of the contents of container J to the atmosphere, i.e. spout 80. This is an important functional feature in many types of particulate material dispensing applications since many of such materials tend to be slightly hygroscopic.

Turning now to a specific consideration of a modified form of a dispenser device having certain of the characteristics of the present invention, as presented in FIGS. 10–13, FIG. 10 presents a partially exploded side view in cross-section of a modified form of dispensing device, wherein the cap element C' is provided with a discharge spout 120 and a lower portion provided with interior threads 122 for attachment to a jar type container or the like.

Cap element C' is further provided with an integral, inset shield member 124 having the configuration of a segment of a cylinder and shielding the atmosphere from direct axis to the contents of the container to which the dispenser device is attached.

In this form of the invention, the rotor element comprises a measuring ring 126 and a knob 128, assembled together by alining the dowels 130 and slots 132, and positioned so that pointer 134 on knob 128 will be in proper relation to quantity marks 136, 138, 140 and 142 respectively denoting "Mild," "Reg.," "Strong," and "Extra Strong" externally on cap element C', as shown in FIG. 11. Such indicia are thus related to the compartmentation provided by partitions 144 disposed annularly on ring 126 and interfitting in the channeling provided by shield member 124. As will be manifest, the compartmentation so formed is of a sufficient size to hold appropriate predetermined quantities of the particulate material.

In assembly, knob 128 is held with dowels 130 alined with slots 132 on ring 126 by an inside groove 146 which snaps over annularly protruding top edge 148 of cap element C'.

Shield member 124 conforms to a segment of the lower edge and inside contour of the cylindrical wall portion 150 of ring 126 and fits snugly against same. Said shield member 124 is of sufficient length circumferentially so that partitions 144 will be closed on the inner side just prior to reaching discharge spout 120, keeping the empty compartments between such partitions closed while others are emptying so no material can enter them until they are returned to a loading, i.e. interiorly exposed, position.

A projection or stop 152 (FIG. 11) is situated on the external face of cap element C which serves to limit the extent of rotation of the rotor element, stopping same when the spaces between partitions 144 are in a loading position. A projection (not shown) similar to said stop 152 is situated on the other side of cap element C', as viewed in FIG. 11, which serves in like manner to stop the rotation of the rotor element when all of the spaces between partitions 144 have emptied through discharge spout 120.

FIG. 13 illustrates application of dispenser devices characteristic of the present invention to a special wall container, the type of dispenser device illustrated in FIGS. 10-12 being selected by way of example. Said wall container has a body portion 160, a hinge lid 162, and a vertically arranged threaded opening 164 dimensioned to threadedly receive the threads 122 of the dispenser device, the attached arrangement of said dispenser device being with the spout 120 thereof arranged for gravitational discharge and with the knob 128 thereof positioned to rotate about a substantially horizontal axis. As will be evident, as contents from wall container 160 funnel into the dispensing device, such are selectively metered in the latter in the same manner as if the dispenser device were attached to a horizontally disposed jar type container.

From the foregoing discussion and accompanying illustration of certain various forms, features and advantages of the present invention, various other forms, features and advantages thereof, including further modification and rearrangement of the various elements forming same, will be apparent to those skilled in the art, within the scope of the following claims.

This application is a continuation-in-part of my copending and now abandoned application Serial No. 671,-813, filed July 15, 1957, and entitled Measuring Dispensing Cap for Powdered and Granulated Materials.

What is claimed is:

1. A metering dispenser device comprising a cap attachable across the mouth of a container, and a rotor rotatably movable a limited degree on said cap about an axis intersecting the mouth of said container, said cap presenting across the face of said container mouth an annularly disposed filling-measuring-discharge section comprising an open segment and a shield segment having a flat, generally radially extending portion and a curved, generally axially extending portion, said rotor element having rotatably movable compartment forming partitions, said partitions when rotated into the open segment of said filling-measuring-discharging section being exposed to the contents of said container for ready filling in directions both radially and axially of said container mouth when the axis thereof is disposed substantially horizontally.

2. A device of the character described in claim 1, wherein detent means comprising a detent post on said cap element and nub and stop means on said rotor element giving indication of the degree of limited relative rotation between said cap and rotor elements.

3. A dispenser device for metering particulate material from a jar type container or the like, comprising a cap element threadedly engageable with the mouth of said container, and a rotor element rotatably movable a limited degree on said cap element about an axis substantially coincident with the axis of the mouth of said container, said dispenser cap element presenting across the face of said container mouth an annularly disposed filling-measuring-discharge section comprising an open segment and a shield segment having a flat, generally radially extending portion and a curved, generally axially extending portion, said rotor element having rotatably movable substantially rectangularly shaped compartment forming partitions, said partitions when in the open segment of said filling-measuring-discharging sectons being exposed along two adjacent sides thereof to the contents of said container for ready filling with said container positioned substantially horizontally.

4. A dispenser device for metering particulate material from a jar type container or the like when the axis of the mouth of said container is disposed substantially horizontally, comprising a cap element attachable across the mouth of said container, and a rotor element rotatably movable a limited degree on said cap element about an axis substantially coincident with the axis of the mouth of said container, said dispenser device presenting across the face of said container mouth an annularly disposed filling-measuring-discharging section and a centrally disposed agitator section comprising a first set of spaced, raised elements on said cap element and a second set of spaced, raised elements on said rotor element providing agitation by relative movement between said set of raised elements.

5. A dispenser device according to claim 4, wherein said spaced raised elements of the agitator section include a detent post on said cap element and nub means on said rotor element, said post and nub means also being positionally related to compartmentation in the device to indicate to the user thereof the amount of material discharged therefrom.

6. A dispenser device for metering particulate material such as instant coffee from a jar type container or the like when the axis of the mouth of said jar type container is disposed substantially horizontally, comprising a cap element threadedly engageable with the mouth of said container, and a rotor element rotatably movable a limited degree on said cap element about an axis substantially coincident with the axis of the mouth of said container, said dispenser device presenting across the face of said container mouth an annularly disposed filling-measuring-discharging section and a centrally disposed agitation section, the said filling-measuring-discharging section comprising an open segment and a shielded segment in said cap element, a series of annularly disposed spaced partitions on said rotor interfitting in said shielded segment, and a discharge spout in said cap element situated radially behind said shielded segment, through which particulate material compartmented between said partitions and said shielded segment discharges as said rotor is rotated on said cap element in a direction moving said partitions from the said open segment of said filling-measuring-discharging section into the shielded segment thereof.

7. A device of the character set forth in claim 6, wherein detent and stop means are disposed in said agitation section and function together with an arch shaped strap element therein to promote agitation of particulate material in said container.

8. A measuring dispenser for discharging a selected amount of granular material from a container held with the axis of the mouth of the container disposed substantially horizontally, said dispenser comprising a body portion having an open end, means for threadedly attaching said body portion across the mouth of said container, a measuring ring arranged on said body portion for selective limited rotation substantially about said axis and having a series of interiorly open, radially arranged material receiving compartments, each said compartments being separated from the adjacent compartment by a partition disposed substantially radially of said axis, the said compartments being interiorly open along two adjacent sides thereof to receive granular material gravitationally flowing out said container mouth in any direction having a component of movement either radially outwardly from said axis or generally parallel to said axis outwardly from said container mouth, said dispenser body portion further comprising an arcuately arranged shield dimensioned to successively receive and substantially closed off said measuring ring compartments as said measuring ring is rotated about said axis, and a discharge opening through the wall of said body portion, situated behind said shield, the said shield being of sufficient length circumferentially so that the measuring ring compartments are closed off by said shield prior to reaching said discharge opening and cannot receive any more material from said container until returned to loading position, the said discharge opening being directable to gravitationally discharge downwardly when the axis of the mouth of the container is disposed in a substantially horizontal position.

9. A measuring dispenser cap for metering a selectively variable amount of granular material from a container, comprising a body portion open at one end thereof, means situated interiorly of said open end for attaching said cap to the mouth of said container, a discharge opening in the wall of said cap, said dispenser cap further comprising a ring with a wide rectangular rim seated inside said cap wall, the lower edge of said rim having a series of material receiving compartments, each of said compartments being open along the lower and inner edges thereof so as to be gravitationally filled with granular material from said container when the latter is disposed with the axis of the mouth thereof disposed generally horizontally, and each of said compartments being of a size to hold a predetermined amount of said material, said ring being rotatable a limited degree about an axis substantially coincident with the axis of said cap thread means, said cap wall further comprising a plate conforming to the contour of the lower edge and inside wall of said rim, and fitting snugly against same, said plate being in radial alinement with the said discharge opening and closing the lower edge and inner side of said compartments as the latter move into gravitational discharge position at said discharge opening by rotation of said ring.

10. A dispenser device for metering particulate material from a container, comprising a cap element threadedly engageable with the mouth of said container, and a rotor element rotatably movable a limited degree on said cap element about an axis substantially coincident with the axis of the mouth of said container, said dispenser device presenting across the face of said container mouth an annularly disposed filling-measuring-discharging section and a centrally disposed agitation section, the said filling-measuring-discharging section comprising an open segment and a shielded segment in said cap element, a series of annularly disposed space partitions on said rotor interfitting in said shielded segment, a discharge spout in said cap element situated radially behind said shielded segment, and ejection means situated interiorly of said shielded segment and in the walls thereof facing said discharge spout.

11. A dispenser device according to claim 10, wherein said ejection means comprises ejection grooves in at least one of the said walls facing said discharge spout.

12. A dispenser device according to claim 10, wherein said ejection means comprises a spring loaded ejection shoe facing said discharge spout, said ejection shoe being periodically depressed by said partition passing same as said rotor element is rotated.

References Cited in the file of this patent

UNITED STATES PATENTS

| | | |
|---|---|---|
| 2,072,938 | Berg | Mar. 9, 1937 |
| 2,083,094 | Rose | June 8, 1937 |
| 2,268,725 | Steel | Jan. 6, 1942 |
| 2,315,244 | Campbell | Mar. 30, 1943 |
| 2,575,967 | May | Nov. 20, 1951 |
| 2,580,096 | Holt et al. | Dec. 25, 1951 |
| 2,585,198 | Warren | Feb. 12, 1952 |

FOREIGN PATENTS

| | | |
|---|---|---|
| 16,351 | Great Britain | of 1895 |
| 32,418 | France | Aug. 2, 1927 |